US009125028B2

(12) United States Patent
Perner

(10) Patent No.: US 9,125,028 B2
(45) Date of Patent: Sep. 1, 2015

(54) METHODS AND APPARATUS FOR VEHICLE STATE CONTROL

(71) Applicant: Ford Global Technologies, LLC, Dearborn, MI (US)

(72) Inventor: David Perner, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 13/656,930

(22) Filed: Oct. 22, 2012

(65) Prior Publication Data

US 2014/0114499 A1 Apr. 24, 2014

(51) Int. Cl.
*G06F 17/00* (2006.01)
*H04W 4/12* (2009.01)
*H04L 29/08* (2006.01)

(52) U.S. Cl.
CPC ............... *H04W 4/12* (2013.01); *H04L 67/125* (2013.01)

(58) Field of Classification Search
CPC ....................................................... H04W 4/12
USPC .................................................. 701/2, 36, 49
See application file for complete search history.

(56) References Cited

U.S. PATENT DOCUMENTS

2008/0287151 A1* 11/2008 Fjelstad et al. ................ 455/466
2009/0177336 A1* 7/2009 McClellan et al. ............... 701/2
2014/0005859 A1* 1/2014 Baskin et al. ..................... 701/2

* cited by examiner

*Primary Examiner* — John Q Nguyen
*Assistant Examiner* — Anshul Sood
(74) *Attorney, Agent, or Firm* — Jennifer M. Stec; Brooks Kushman P.C.

(57) ABSTRACT

A system includes a processor configured to receive a text message from a remote device including an instruction for a vehicle system. The processor is also configured to determine a specific vehicle associated with the remote device. Further, the processor is configured to send the instruction as a text message to a phone provided to the specific vehicle associated with the remote device. The processor is additionally configured to receive confirmation from the vehicle that the instruction was processed and send a confirmation text to the remote device.

19 Claims, 3 Drawing Sheets

METHODS AND APPARATUS FOR VEHICLE STATE CONTROL

TECHNICAL FIELD

The illustrative embodiments generally relates to methods and apparatus for vehicle state control.

BACKGROUND

Remote control of vehicle options has long been a feature desired by vehicle users. Key fobs present opportunities to unlock doors, open trunks, and even to remotely start vehicles. In many cases, however, the number of buttons on a key fob limits the functionality. Since there would be a large device required to provide a number of buttons, typical remote control has been limited to a few common features.

The availability of cellular phones with interactive displays have provided new avenues for expanding control of vehicles. Interfaces have been proposed, allowing a user to utilize a touch screen display to remotely control a number of vehicle settings, through the use of an application running on a phone communicating with a vehicle. Unfortunately, not everyone has a phone capable of such interaction, but even relatively simplistic phones are generally far more powerful than a typical key-fob.

U.S. Patent Application 2008/0287151 generally relates to a system that enables communications between a mobile wireless communication device, such as a cellular phone, and an asset monitoring device using a text messaging protocol, such as Short Message Service (SMS). A command text message is entered on the mobile wireless device including a serial number of the asset monitoring device, a PIN and a command for the monitoring device. The command text message is transmitted via a wireless communication network and is forwarded to a service provider. Upon validation of the serial number and PIN, the service provider transmits a command to the wireless asset monitoring device via the wireless communication network. The wireless asset monitoring device receives the command and performs an action based thereon. For example, if the command is a LOCATE command, the wireless monitoring device transmits its current location, such as in latitude/longitude coordinates. The wireless asset monitoring device also transmits a response indicating a completed action or indicating that action was not taken for some reason. The service provider receives the response from the monitoring unit, parses the response, and constructs a report text message which is transmitted to the user's mobile communication device. The report text message is then displayed on the mobile communication device.

SUMMARY

In a first illustrative embodiment, a system includes a processor configured to receive a text message from a remote device including an instruction for a vehicle system. The processor is also configured to determine a specific vehicle associated with the remote device. Further, the processor is configured to send the instruction as a text message to a phone provided to the specific vehicle associated with the remote device. The processor is additionally configured to receive confirmation from the vehicle that the instruction was processed and send a confirmation text to the remote device.

In a second illustrative embodiment, a system includes a processor configured to receive a text message from a remote server, including an instruction for a vehicle system. The processor is also configured to access a vehicle system specified in the text message. The processor is further configured to take action with regards to the vehicle system as specified in the text message. Also, the processor is configured to respond to the remote server with confirmation of the action.

In a third illustrative embodiment, a computer-implemented method includes receiving a text message, at a vehicle computing system (VCS), from a remote server, including an instruction for a vehicle system. The method also includes accessing a vehicle system, via the VCS, specified in the text message. The method further includes taking action with regards to the vehicle system as specified in the text message. Also, the method includes responding to the remote server with confirmation of the action.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
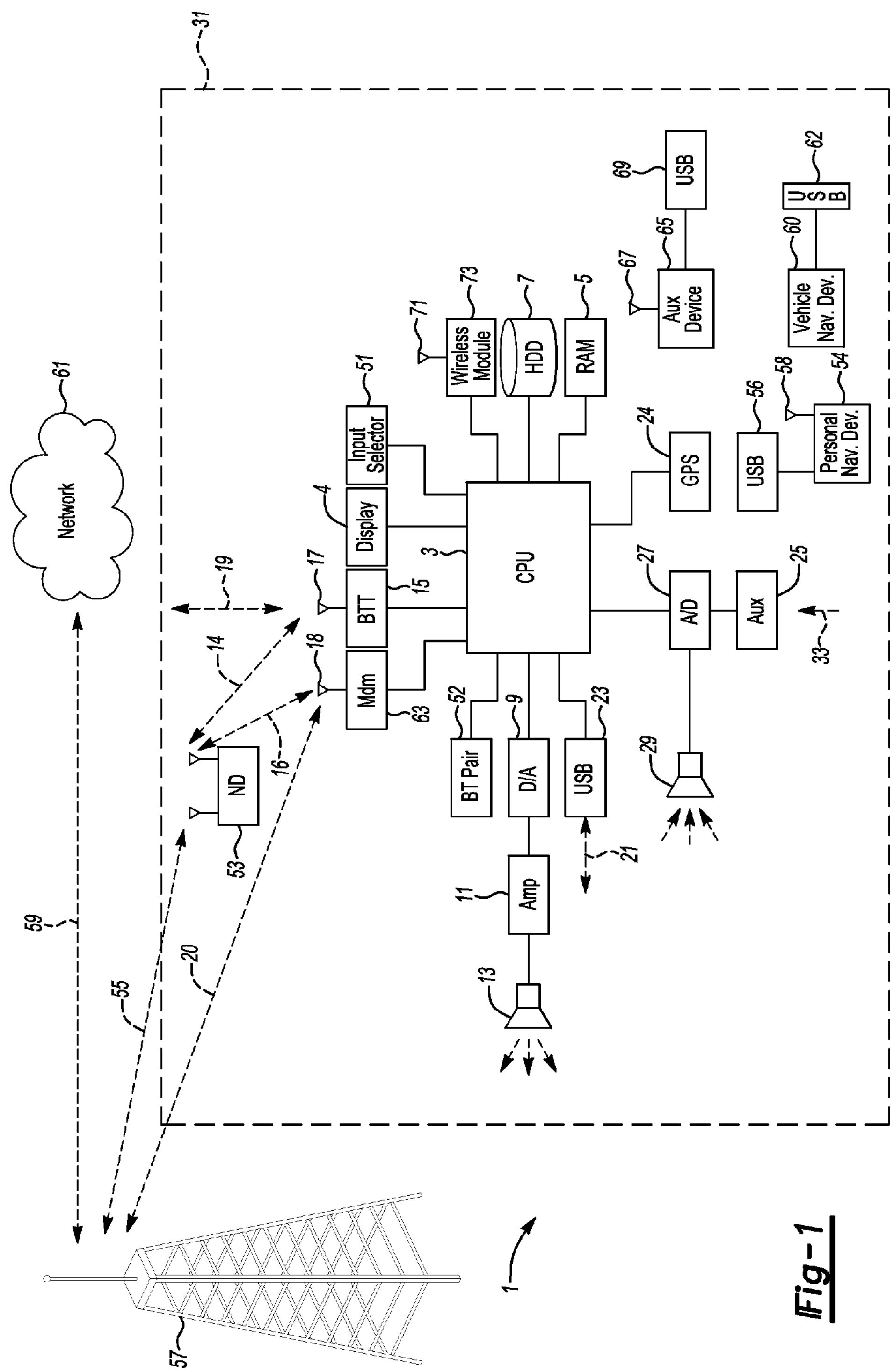
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). BLUETOOTH is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Various solutions have been proposed to allow interfacing with a smart-phone and a vehicle computing system. Utilizing communication between a phone with a visual interface and a vehicle computing system, the processes would often present a visual display of phone options, and then utilization of the smart phone would transfer commands and selections from the menus to a vehicle computing system for implementation on a vehicle. This typically involved both the use of a data plan to transfer data between a phone and a vehicle, and further involved the use of a visual display on a phone providing a menu.

In the above instances, when a connection could be established between a phone and a vehicle, data could be transmitted directly to a vehicle for implementation. Of course, in order to implement such a solution, a user must have both a smart phone and a data plan available for use. While this has become increasingly common, there are still numerous areas that have low data availability, and there are still a large number of people lacking smart phones and/or phones with proper interfaces for providing a fully functioning application that can provide vehicle control options.

The illustrative embodiments propose a solution to relax the more rigorous requirements associated with some of the smart phone+data plan solutions. Utilizing the illustrative embodiments, users lacking smart-phone capability and/or data-plan access can still use a phone to communicate with a vehicle computing system and control features as permitted by a manufacturer and/or application designer.

Generally, in the proposed embodiments, text messaging will be used as a proxy for data transfer to and from the vehicle via a data-plan. Since text messaging is often available in areas where a more conventional data plan is not, this can provide a much wider range of geographic regions in which phone control of vehicle options can be implemented. In at least some embodiments, texts will be sent directly to a server which is linked to a vehicle phone. The server can then communicate a text "feed" to and from the vehicle, providing communication with the vehicle.

Even in the case where a smart phone application is used, this system can provide a layer of redundancy when a data plan is not available. In one embodiment, the user may actually enter a command-line style command, such as, for example, <window_state=closed> or <vehicle_temperature=75>. These could be exemplary instances of commands to roll up any open windows or to set a vehicle temperature to seventy five degrees. Both of these options could be accessible in an application running on a smart phone, which may or may not first try to utilize a data plan to convey the commands to the vehicle directly. If the direct communication is not possible, the process may try to utilize a text feed to relay the commands. Since, in this example, the user is accessing an application interface, as opposed to typing a text (which is also possible), the application itself could relay the commands.

In another example, the process may be based on simple text messages, wherein a user could send text commands to the vehicle through a server on an account previously linked between a given phone and a vehicle. In this instance, the user could enter the command-line style commands or, in another example, the user could enter "plain language" commands and the server could translate those commands to the presumably corresponding command-line commands for the vehicle.

Figure 2:
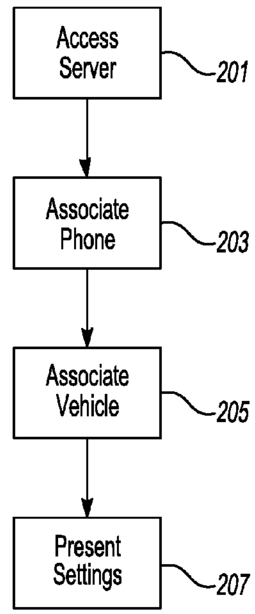
FIG. 2 shows an illustrative example of a process for associating a phone with a vehicle in a remote account.

FIG. 2 shows an illustrative example of a process for associating a phone with a vehicle in a remote account. In this illustrative embodiment, a remote server is accessed via a wireless device 201. In this example, the server provides the communication between the vehicle and the remote device (e.g., phone, tablet PC, etc.). The server may have a fixed number associated therewith, and the user (or an application running on the user's device) may send a text message to the fixed number (whereby the server can route the number to the appropriate vehicle).

Once the remote server receives the text message, in this embodiment, it can check to see if the current phone is already associated with a vehicle. In this instance, since the request is for pairing a new phone, the phone will not be associated with a vehicle, and the server can first create an account recognizing the incoming mobile number (or other appropriate identifier) 203. Once this first half of the pairing has been created, the user can enter a vehicle identifier for pairing with the vehicle. This can be, for example, a vehicle identification number (VIN), the number of a mobile phone provided to vehicle (vehicle mounted) to which messages can be sent, or even just an owner identifier that references a stored file to see which vehicle belongs to that owner.

In the case where a vehicle mobile phone number is used, no additional information may be needed to be acquired, although in some cases it might be further desirable to obtain a secondary level of permission. For example, in at least one instance, the user may have to explicitly log-in to a website and correlate a mobile phone number and a particular vehicle. This provides a degree of password and login protection to the association process. Especially in cases where the communications will be used to open/close windows, start a vehicle (for temperature change, for example) or otherwise provide possible access and/or power to a vehicle, it may be desirable for a user to be required to pair the phone and the vehicle in a protected manner.

Once any suitable protections have been utilized, the server may then associate a vehicle with the incoming user ID (e.g., phone number) 205. In the future, mobile messages incoming to the server from the phone having the registered ID can be relayed to the associated vehicle. In at least one instance, a phone may be associated with a plurality of vehicles, and the messages themselves may designate a particular vehicle for delivery. If the designated vehicle aligns with one of the associated vehicles, the message can be delivered.

Initial pairing of the vehicle and the phone can be achieved in several manners. One relatively seamless manner may be performed in an environment wherein the phone has been previously BLUETOOTH paired with a vehicle. In such a case, upon the pairing of the phone and vehicle in a BLUETOOTH pairing (which presumably requires permissible access to a vehicle), a vehicle computing system can also prompt a user as to whether or not "text pairing" is desired. If the user does wish to pair the devices, the process can send a signal to the remote text server instructing pairing of the device and the vehicle. This could prevent a user from later having to go through the pairing process.

In another example, wherein the text system is acting as a backup for a data-plan based system, upon the first use of the data-plan style communication between the vehicle and the phone, a message can be sent to the remote server to pair the phone and vehicle for text communication as well. In this case, if a data plan were unavailable, it wouldn't even necessarily be apparent to the user that this were the case, as the previously activated text based processing could serve as a sufficient proxy for the data, and the user wouldn't have to go through any additional authentication steps.

In yet another example, password transmission (or code transmission, PIN transmission, etc) could be required in each instance, to provide a more robust form of security and guard against vehicle access via a stolen or otherwise impermissible phone. In any event, following an appropriate pairing process, the vehicle and phone can be associated via the remote server, so that acceptable incoming messages can be appropriately handled.

In this case, when the devices are associated, the server can then pass back to the phone a list of options that can be controlled via text messaging. These options can be saved in a user-accessible file, and/or provided to a user application so that the application can recognize which vehicle states/functions can be controlled via text messaging for a particular vehicle 207.

Figure 3:
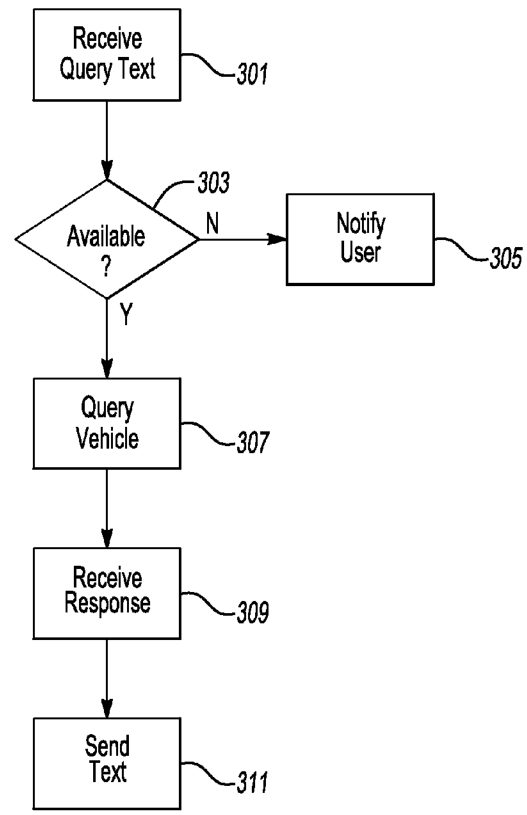
FIG. 3 shows an illustrative example of a query process.

Text messaging can be used for both instruction of state changes (temp, windows, doors, volume, etc.) and for querying a current state of a vehicle system (temp, windows, charge/fuel, etc.). FIG. 3 shows an illustrative example of a query process, for retrieving information about one or more vehicle states.

In this illustrative example, the remote server receives a request from a user's mobile device, asking about the status of some state or component of a vehicle 301. As previously noted, these can include, but are not limited to, vehicle temperature, door lock status, window status, charge/fuel remaining, etc. In some instances, these could even be used to monitor a vehicle and information such as location and or current speed could be provided.

Once the query text has been received, the process may check a file stored with respect to a vehicle to see if the particular requested option is available for a given vehicle 303. In some cases, certain data may only be available for certain vehicles, and an application or user requesting the data may not be aware that certain requested data is not available for the specific vehicle from which the data was requested. If the data is unavailable, the user can be notified 305 that the requested data is unavailable for that vehicle. In other instances, the remote process may simply send the request and then notify the user if the data is unavailable, if it is the case that the server system doesn't track data availability for each vehicle.

If the requested data is available, in this illustrative example, the process may send a text query to the vehicle 307. Also, it is possible that only one half of the user/vehicle combination is out of range of a data-plan. In such a case, the server may translate between data and text so that the most efficient use of data transfer can be achieved. For example, if a user was hiking in an area that only allowed text messages to be sent, but a vehicle was parked in an area where data was available, then a text from the user to check a car temperature may be received by the server, passed via a data-plan to the vehicle in an appropriate format, received as a data-plan response by the vehicle, and then translated and passed as a text back to the user.

Once the query has been sent to the vehicle, a response can be received (in the appropriate format). For example, the vehicle could respond to the remote system with a text message 309, and the formatting of the text message may or may not be suitable for passing back to a user. In at least one example, the vehicle formats the text message and sends an appropriate response to the server in a form suitable for conveyance to a user. In another example, the vehicle may respond using some machine level code or other unreadable code, upon which the server may translate the code and send a suitable response back to a user 311. Either method can be utilize depending on a number of factors, including the amount of work which it is desirable to have a vehicle and/or a remote server perform.

Figure 4:
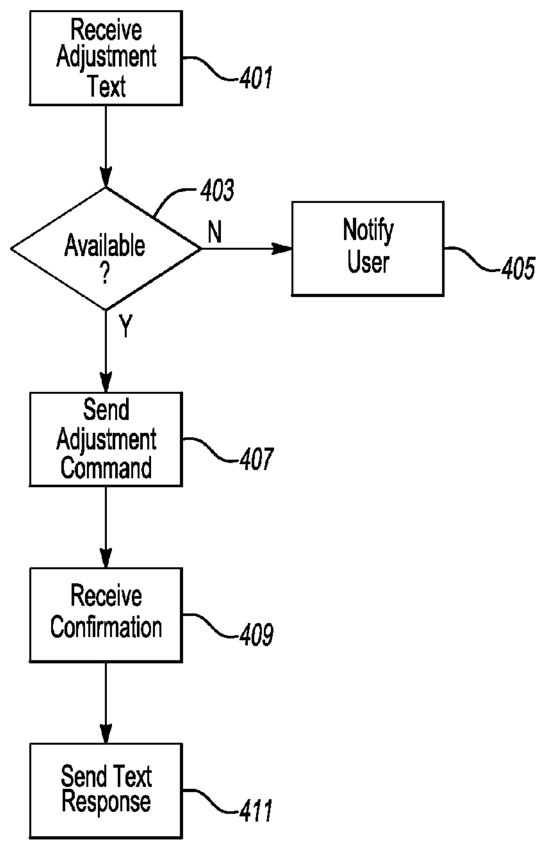
FIG. 4 shows an illustrative example of an adjustment process.

FIG. 4 shows an illustrative example of an adjustment process. In this illustrative example, the user may attempt to modify a vehicle state, setting, system, etc. A non-limiting set of modifiable vehicle constraints includes, but is not limited to, windows, doors, temperature, volume, sunroof, charging on/off, etc. What can or cannot be modified may also vary with particular specific vehicles, models, makes, etc.

In this illustrative example, the remote server receives a request for an adjustment via text from a user's mobile device 401. Again, this could be sent by the user directly, or could result from an application running on the mobile device. Additionally, this could be a "plain language" request or could be formatted in a form to be passed and usable directly by a vehicle.

As with the query, the remote server may know for a given vehicle which options are or are not available for adjustment. In the case where these options are known, the process can determine if requested option can be adjusted by a user 403. If the option cannot be adjusted, the process may notify a user 405.

In at least one embodiment, the availability of options may vary with the type of communication available with a vehicle. For example, if the server can currently communicate with the vehicle using both a data-plan and a text option, then a full range of options may be available. This could be, for example, because it is assumed that if a data-plan is available, then even with some signal strength variance, text messaging should likely get through in any event. So, for example, in a case where window state is being adjusted to "open", the process may only allow the adjustment without user notification if it is likely that the windows can be easily closed as well. In the case where only text signaling to a vehicle is available, the process may warn a user first, that a future request to roll up the windows may not be processed, and require confirmation to proceed. In some instances the availability of data may have little or nothing to do with the strength of a text signal, so this check and balance may not be needed.

If the system to be adjusted is a viable option for user adjustment via text messaging, as requested, the process may send an adjustment command to the vehicle 407. Since an actual modification of a vehicle state, system, process, etc. is being requested, it may be useful to let a user know that the requested change was successful. In such a case, the process may also receive confirmation from the vehicle that the adjustment was successful 409. Upon receipt of the confirmation (or upon a failure to receive confirmation), the process may then notify the user with the appropriate result 411.

In this manner, the user can communicate with nothing more than a text-capable phone, using messaging to communicate between the phone and the vehicle. In a very simple solution, command-line commands can be sent between the phone and the vehicle using a remote server providing little more than basic security and pairing, and even the most basic of mobile phones with a minimal text plan can be used to control at least a few vehicle settings.

In some scenarios, the text-based system may serve as a backup or even a standard backbone of a mobile application designed for vehicle control via a mobile device. In such an instance, the mobile application may have a number of options provided by an application designer. These options could correspond, for example, to all queryable options for all of a manufacturers vehicle (similarly for the adjustable options). In such a case, the user may configure a particular application with the various options. In order to present a more user-friendly option, however, it may also be possible to dynamically present these options so that an application on a given phone can self-configure. Even if a phone were usable to control multiple vehicles, a simple request could present a list of options available/not available for a particular vehicle whenever access were desired.

In one non-limiting example, this can be achieved by a simple text message by a string of binary variables indicating 1—available 0—not available for each option. So a 256 character string could indicate all options available (out of 256) on a given vehicle with nothing more than 0100111011001001 . . . etc., wherein each binary digit corresponds to a different option. In this manner, if there were 256 or fewer options available between all vehicles made by a manufacturer, any application could determine any vehicle's available options with a simple text message. This example is not meant to be limiting in any way, but merely to show the relative simplicity of querying a vehicle to determine option availability in a standardized format.

Figure 5:
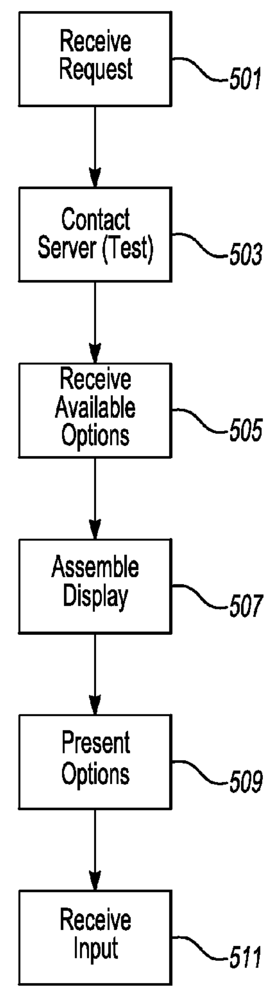
FIG. 5 shows an illustrative example of an adjustment option delivery process.

FIG. 5 shows an illustrative example of an adjustment option delivery process. In this illustrative example, it is assumed that an application has received a request from a user for a set of queryable and/or adjustable options for a particular vehicle 501 (or, in many cases, the user is simply activating the application at this step). The application may be, for example, running on a PC or mobile device remote from the vehicle and the intermediary server.

Once the request to access the application has been received, the process contacts the intermediary server 503. In the case where the vehicle or the server can return an entire configuration, as noted above, the process can send a simple query to determine availability with regards to all the options. In another instance, the process may have to send a test query for some or all of the options, and then build a list of available options based on which are or are not available.

Since the user may not want to, for example, lower and raise windows in order to determine if that is an available option, in the instances where a configuration is not immediately available the process may have a "do not act" command that it can send for each tested variable. In such a case, the server may just receive, for example, a confirmation (e.g., the option exists) or rejection (e.g., the option does not exist or is not alterable) of each "do not act" command. In this manner, the options can be queried without changing the state of any option.

When the configuration has been returned from the server 505, the application can then assemble a display 507 of the available options and present them to the user 509. Whether the option is using data-plan access or text access, this is essentially user-transparent here, because the user is presented with the display. Once the user has been provided with the display, the process can receive user input 511 relating to either queries and/or instructions, and can react accordingly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:

a processor configured to:

receive a text message from a remote device including an instruction for a vehicle system;

determine a specific vehicle, containing the vehicle system, associated with the remote device based on a stored pairing;

send the instruction as a text message to a phone provided to the specific vehicle;

receive confirmation from the vehicle that the instruction was processed; and send a confirmation text to the remote device.

2. The system of claim 1, wherein the processor is configured to determine the specific vehicle associated with the remote device based on vehicle identification information sent with the received text message from the remote device.

3. The system of claim 1, wherein the text message received from the remote device is in a plain language format and the processor is configured to translate the text message from the remote device into a command-line language suitable for implementation by a vehicle computing system provided to the vehicle.

4. The system of claim 1, wherein the confirmation is in a non-plain-language format and the processor is configured to translate the confirmation to a plain-language format.

5. The system of claim 1, wherein the instruction includes an instruction to alter a state of a vehicle system.

6. The system of claim 1, wherein the instruction includes a query as to a state of a vehicle system, and the confirmation includes a response to the query.

7. A system comprising:

a processor configured to:

receive a text message from a remote server, including an instruction for a vehicle system;

access the vehicle system specified in the text message;

take action with regards to the vehicle system as specified in the text message; and respond to the remote server with confirmation of the action, wherein the remote server identifies the processor as a desired recipient of the text message based on a stored pairing with a remote device; and wherein the remote server receives a text message from the remote device.

8. The system of claim 7, wherein the system includes a mobile device configured to receive and send text messages and in communication with the processor.

9. The system of claim 7, wherein the instruction includes an instruction to alter a state of the vehicle system.

10. The system of claim 9, wherein the processor is configured to take action with regards to the vehicle system as specified in the text message by altering the vehicle state as specified in the text message.

11. The system of claim 7, wherein the instruction includes a query as to a state of the vehicle system.

12. The system of claim 11, wherein the confirmation includes a response to the query, indicating the state of the vehicle system.

13. The system of claim 7, wherein the instruction includes a query as to queryable vehicle systems and alterable vehicle systems.

14. The system of claim 13, wherein the confirmation includes a response to the query, including indicia of available queryable vehicle systems and alterable vehicle systems.

15. A computer-implemented method comprising:

receiving a text message, at a vehicle computing system (VCS), from a remote server, including an instruction for a vehicle system;

accessing the vehicle system, via the VCS, specified in the text message;

taking action with regards to the vehicle system as specified in the text message; and responding to the remote server with confirmation of the action wherein the remote server identifies the VCS as a desired recipient of the text message based on a stored pairing with a remote device; and wherein the remote server receives a text message from the remote device.

16. The method of claim 15, wherein the instruction includes an instruction to alter a state of the vehicle system.

17. The method of claim 16, wherein taking action with regards to the vehicle system as specified in the text message further includes altering the vehicle state as specified in the text message.

18. The method of claim 15, wherein the instruction includes a query as to a state of the vehicle system.

19. The method of claim 18, wherein the confirmation includes a response to the query, indicating the state of the vehicle system.

* * * * *